W. V. WALKER.
MILK-COOLER.
No. 187,333. Patented Feb. 13, 1877.
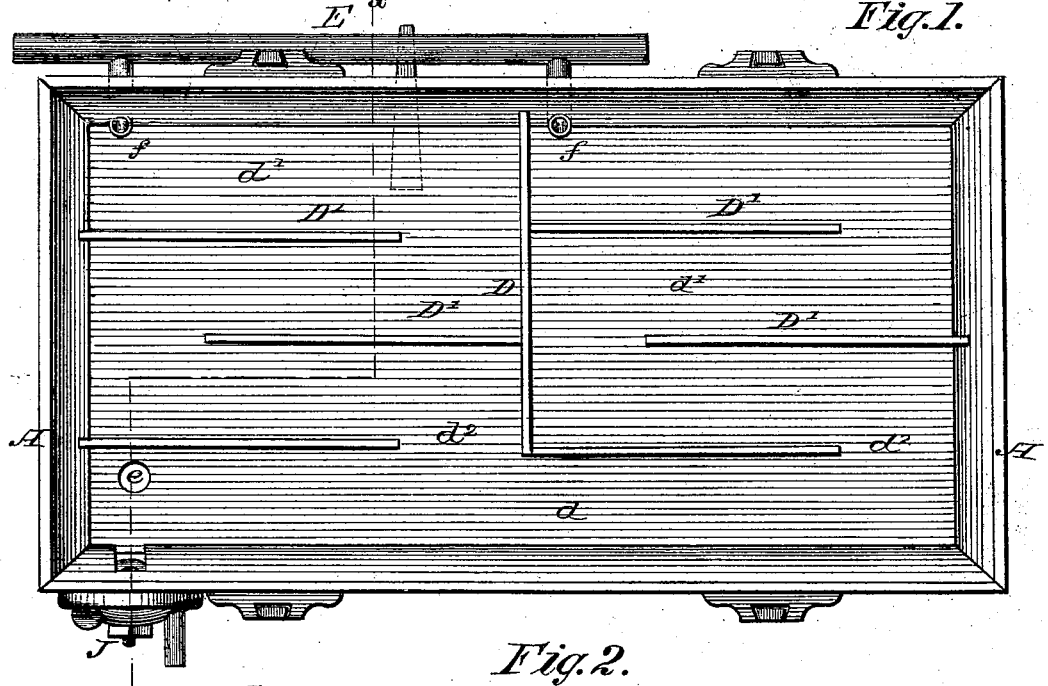
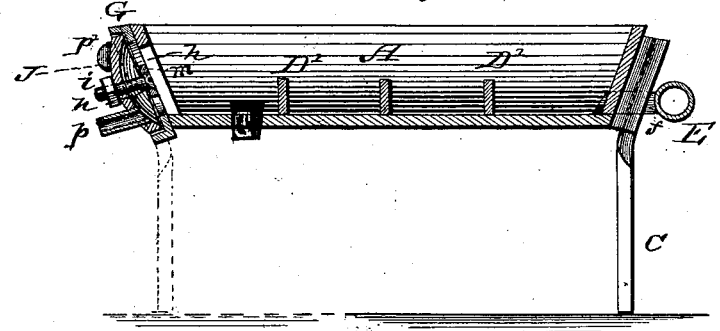
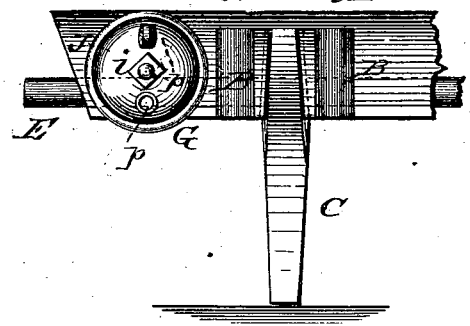 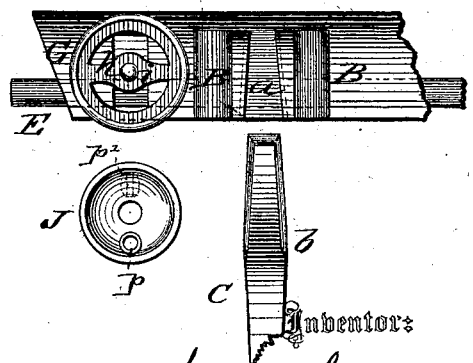
Witnesses:
P. C. Dieterich
Frank H. Duffy
Inventor:
Wm. V. Walker
Per: C. H. Watson & Co. Attorneys

UNITED STATES PATENT OFFICE.

WILLIAM V. WALKER, OF MORAVIA, NEW YORK, ASSIGNOR TO HIMSELF AND SILAS B. YOUNG, OF SAME PLACE.

IMPROVEMENT IN MILK-COOLERS.

Specification forming part of Letters Patent No. 187,333, dated February 13, 1877; application filed December 9, 1876.

*To all whom it may concern:*

Be it known that I, WILLIAM V. WALKER, of Moravia, in the county of Cayuga and State of New York, have invented certain new and useful Improvements in Milk-Coolers; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a milk-cooler, as will be hereinafter more fully set forth.

In the annexed drawing, Figure 1 is a plan view of my improved milk-cooler. Fig. 2 is a section of the same through the line $x\,x$, Fig. 1. Figs. 3 and 4 are detailed views of parts thereof.

A represents the cooling-vat, of any suitable dimensions and formed with flaring sides, as shown. On each side of the vat A, near each end, is secured a casting, B, provided with a dovetailed tapering groove, $a$, for the reception of the leg C. The groove $a$ is made wider at the bottom than at the top, and the leg C is made with a bend at $b$, and the upper end of the leg, above said bend, is formed with beveled edges to correspond with the dovetailed groove. The main or lower portion of the leg stands vertical, while the upper end corresponds with the inclination of the flaring side of the pan. On the bottom of the vat A is a rib or partition, D, extending crosswise from the center of one side to near the other, dividing, as it were, the vat into two parts, except along one side of the vat, where is left one continuous passage, $d$, at one end of which, in the bottom, is the aperture $e$, for draining the vat of all water. In each of the two divisions of the vat is a series of ribs, D' D', extending alternately from the end of the vat to near the center rib D, and from said center rib to near the end, forming in each division a tortuous passage, $d^1$, which communicates at $d^2$ with the continuous passage $d$. E represents the water-supply pipe, which has branches, $f\,f$, entering the end of the passage $d^1$, of each division, so that the water is supplied and enters simultaneously at one end and near the center of the vat, and then flows back and forth in each division until both streams enter and unite in the passage $d$.

If the aperture $e$ were left open, the water would at once pass out; but this should be closed by a plug, and then the height of the water in the vat will be regulated by means of a register placed in the side of the pan directly opposite to the aperture $e$.

This register is constructed as follows: In the side of the vat is an opening, $h$, and over this opening, on the outside of the vat, is placed a circular skeleton frame, G, having a central cross-bar, $m$, through the center of which is passed a bolt, $n$. The frame G forms a seat for a concave disk, J, placed thereon, and through which disk the bolt $n$ passes, the bolt being provided on its outer end with a nut, $i$, for holding the disk tightly to its seat. The disk J is provided with an outlet-tube, $p$, near the edge; and opposite this tube, on the other side of the center, is a projection, $p'$, by means of which the disk may be turned so as to place the outlet-tube at any height desired. The water in the vat will, of course, stand as high as the tube $p$, and hence by changing the position of this tube—by simply rotating the disk—the height of the water in the vat is easily regulated.

In the construction of the vat—especially in large vats—I may arrange it in more than two divisions, and admit the water in each of said divisions—that is, in two or more places simultaneously.

Having thus fully described my invention, what I claim as new, and desire to secure by Letters Patent, is—

1. The vat A, provided with one or more cross-ribs, D, and series of alternating ribs D' D', arranged to form two or more tortuous passages, $d^1$, and one common outlet-passage, $d$, in combination with the water-supply pipe E, having two or more branches, $f\,f$, so as to admit water simultaneously in two or more places, substantially as herein set forth.

2. In combination with a milk-cooler, the register herein described, consisting of the skeleton frame G, with cross-bar m, placed over the aperture h, the rotating concave disk J, with outlet-tube p, and the central bolt n, with nut i, all substantially as and for the purposes herein set forth.

In testimony that I claim the foregoing as my own I affix my signature in presence of two witnesses.

WILLIAM V. WALKER.

Witnesses:
ROBERT M. WALKER,
HECTOR H. TUTHILL.